UNITED STATES PATENT OFFICE 2,044,417

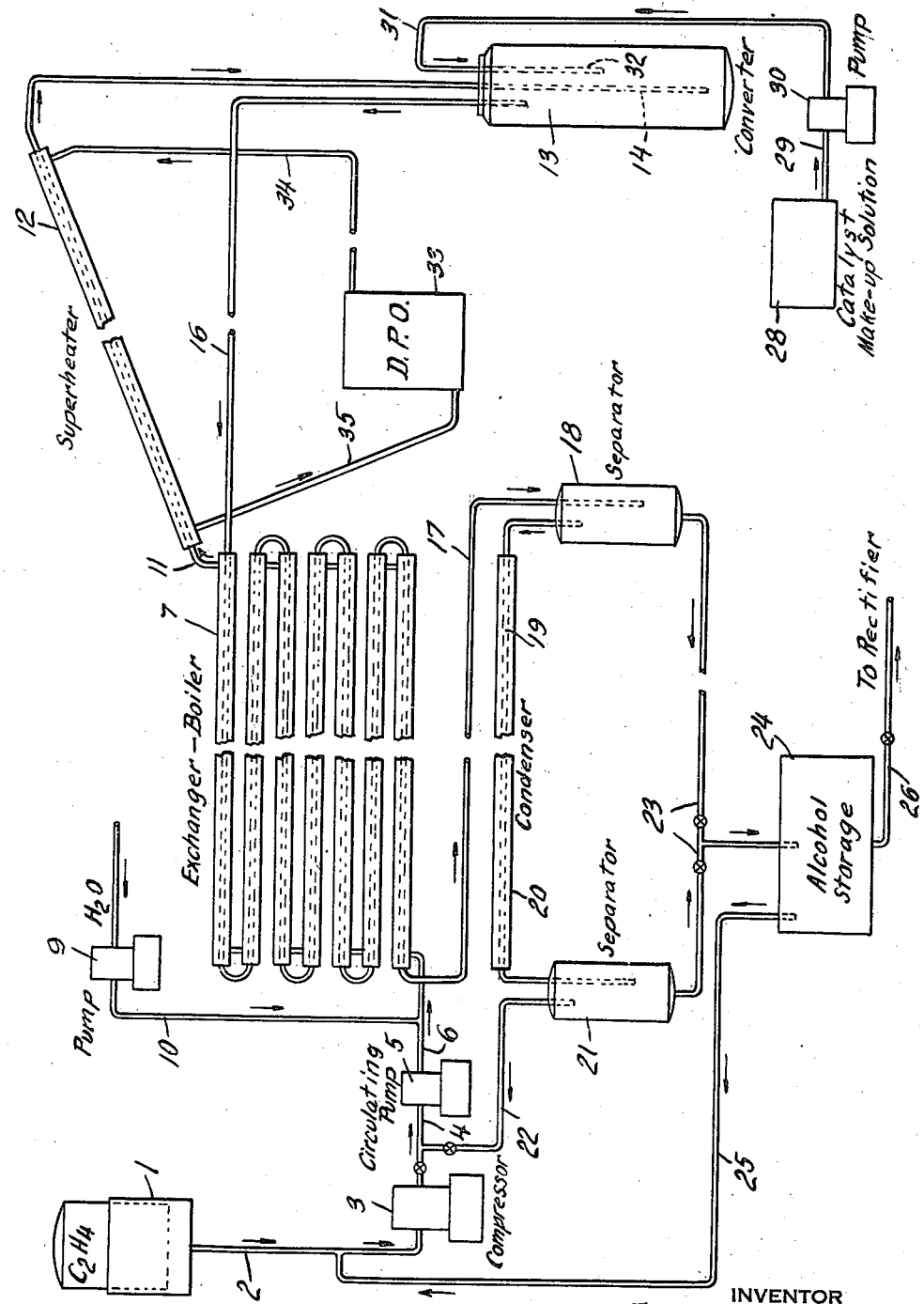

PRODUCTION OF ALCOHOLS

Frederick R. Balcar, Stamford, Conn., assignor to Air Reduction Company, Incorporated, New York, N. Y., a corporation of New York Application April 12, 1935, Serial No. 15,949

6 Claims. (Cl. 260—156)

This invention relates to improvements in the hydration of alkylene hydrocarbons, and more particularly improvements in the production of alcohols from alkylene hydrocarbons with the use of an acid catalyst.

Alcohols, e. g. ethyl alcohol, can be produced continuously by passing an alkylene hydrocarbon, e. g. ethylene, in admixture with suitable proportions of steam into intimate contact with an acid catalyst, e. g. a sulphuric acid or phosphoric acid catalyst, while maintaining the catalyst at a high temperature and maintaining the gases under a high pressure. By proper regulation of the temperature, pressure and ratio of steam to alkylene hydrocarbon, the acid can be maintained at approximately constant strength and the process can be carried out continuously over a long period of time.

In this continuous process, when long-continued, there is some loss of acid. The hydrocarbon gases and steam circulated through or in intimate contact with the acid tend to cause some small amount of entrainment of the acid. Where loss of acid takes place for this or other reasons, it is necessary to supply added acid to make up for the loss, particularly in continuous operations over long periods of time.

The converter in which the acid catalyst is contained must be maintained at a high temperature, and under a high pressure, and it cannot be opened to supply added acid without shutting down the process. Acid can be supplied, through suitable piping, to the converter, from time to time, as needed, but this requires acid-resistant equipment both for the storing and for the supply of the acid to the converter, and this apparatus is expensive, since the acid must be pumped into the converter under the high pressure prevailing therein.

The present invention provides an improved process in which the handling and supply of acid is obviated, and the need of acid-resistant and expensive equipment for supplying the acid is obviated, and in which the loss of acid can be compensated for in a simple and advantageous manner.

According to the present invention, alkyl sulfate or alkyl phosphate or a solution thereof in a suitable solvent such as ether, alcohol, or a liquid hydrocarbon is separately produced and is supplied in a neutral or approximately neutral condition to the converter, and this alkyl sulfate or phosphate is hydrolyzed in the converter to supply added acid as required to make up for losses.

The alkyl esters of the acids used as catalysts are non-corrosive or practically so, and they can be supplied to the converter without the necessity of expensive non-corrodible equipment.

In general, the alkyl ester employed will be that which is formed as an intermediate product or as a part of the catalyst during the process. That is, it will be an ester of the acid used as the catalyst, and the alkyl group will correspond to the alkylene hydrocarbon used and the alcohol produced. In producing ethyl alcohol from ethylene with the use of a sulfuric acid catalyst, the ethyl sulfate is advantageously employed; and with a phosphoric acid catalyst, the ethyl phosphate. When making isopropyl alcohol from propylene with the use of a sulfuric acid catalyst, the propyl sulfate will ordinarily be employed.

Diethyl sulfate is a liquid having a boiling point of 208° at atmospheric pressure. The triethyl phosphate has a boiling point at 215° at atmospheric pressure. The alkyl sulfate and phosphate can be readily produced in a neutral or substantially neutral state and can be stored and supplied to the converter in small amounts from time to time as required to make up for losses. They are readily hydrolyzed when added to the converter and when they come into contact with the hot acid catalyst and steam therein, giving alcohol and acid, which acid is thus added to the body of acid catalyst in the converter.

The process of producing alcohols from alkylene hydrocarbons can be varied as to the temperature, pressure, nature and concentration of acid, and ratio of steam and alkylene hydrocarbon; but these variables are interdependent. The acid catalyst is advantageously a dilute acid catalyst, for example, sulfuric acid of from 5 to 50% strength. High pressures are advantageous, for example, around 600 pounds or higher, or around 1000 to 2000 pounds or higher per square inch. The temperature will vary with the strength of the acid and with the other conditions and will in general be between 200 and 300° C.

The invention will be further described in connection with the accompanying drawing, which illustrates, in a somewhat conventional and diagrammatic manner, an apparatus adapted for the practice of the process. The apparatus illustrated is of the general nature described in United States Letters Patent No. 2,021,564.

The apparatus illustrated is one in which the admixed steam and ethylene are preheated in a heat interchanger and in a superheater before entering the converter, and in which the hot alcohol-laden gases from the converter pass through the heat interchanger, as described in said prior application. The steam required is supplied in the form of water at a low temperature and this water is heated and vaporized in the presence of the ethylene in the countercurrent heat interchanger.

Referring to the accompanying drawing, the supply of ethylene is indicated conventionally at 1 and is drawn off as required through the line 2 and forced by the compressor 3 through the lines 4 and 6 to the heat interchanger 7. Water is supplied through the line 10 by means of a pump 9 and enters the heat interchanger through the line 6. The heat interchanger is a combined boiler and condenser, serving to heat the liquid water to its boiling point and to vaporize it and form steam in the presence of the ethylene, and serving also to cool the hot gases from the converter and condense alcohol therefrom. From the heat interchanger the admixed steam and ethylene pass through the superheater 12 where they are further heated and then to the converter 13 where they enter near the bottom through the line 14.

The superheater is shown as heated by diphenyloxide circulated from the boiler 33 through the lines 34 and 35. The converter is shown conventionally but it will in practice be provided with insulation and with means for heating or cooling the converter and regulating its temperature, as well as suitable means for insuring intimate contact of the gases and acid catalyst, such as Raschig rings or other filling material (not shown).

From the converter, the unchanged ethylene and steam together with alcohol vapors formed in the converter pass through the line 16 to the heat interchanger where the gases and vapors are cooled and condensation of alcohol occurs, owing to the countercurrent arrangement of the heat interchanger. The condensed alcohol and uncondensed gases and vapors pass through the line 17 to the separator 18, where the aqueous alcohol collects, and from which the uncondensed gases and vapors pass through the line 19 in the condenser 20 to further cool the gases and condense additional alcohol therefrom which is collected in the separator 21. The remaining ethylene then returns through the line 22 to the line 4 and is recirculated by the pump 5 in a cyclic manner, and with additional supply of ethylene as required from the storage tank 1, by means of the compressor 3 to make up for the ethylene converted into alcohol in the process.

The aqueous alcohol collected in the separators 21 and 18 is drawn off through the line 23 and pressure released thereon and the alcohol is collected in the storage tank 24. The ethylene held in solution in the aqueous alcohol under high pressure is largely released on reduction of pressure in the tank 24 and is returned through the line 25 for admixture with fresh ethylene supplied to the process. The aqueous alcohol is drawn off from the storage tank 24 to a rectifying column or to a storage tank through the line 26.

The apparatus thus far described is one well adapted for use in the continuous production of alcohols from alkylene hydrocarbons over prolonged periods of time. In operation, the acid catalyst contained in the converter 13 may be, for example, sulfuric acid of around 5 to 50% strength, and, for some purposes, around 15 to 30% strength, and this acid may be maintained e. g. at a temperature of around 250 to 300° C. It may have promoters added to it, for example, silver sulfate, etc., and, in operation, it is probable that more or less alkyl sulfate or sulfates are formed so that the catalyst is a mixture of sulfuric acid and alkyl sulfate or sulfates.

In order to make up for losses I provide a supply of alkyl sulfate in the tank 28 and pump small amounts of this alkyl sulfate through the lines 29 and 31, by means of pump 30, this alkyl sulfate advantageously entering the body of catalyst at 32 in the lower part of the converter. The amount of alkyl sulfate required is not large, but small and regulated amounts can be added from time to time as required. This alkyl sulfate, coming into contact with the body of acid catalyst in the converter, and with the steam therein, is readily hydrolyzed to give alcohol and sulfuric acid, and the acid thus formed is added to that already present in the converter, to make up for losses. This enables the process to be continued for long periods of time without excessive reduction in the amount of acid present in the converter and without the need of having and supplying fresh acid as such to the converter.

While I have described the process more particularly in connection with the use of a sulfuric acid catalyst, it will be understood that a phosphoric acid catalyst can be similarly used, or a mixture of phosphoric and sulfuric acids. The apparatus should of course be made of acid-resistant material where it comes in contact with the acid, but it is one advantage of the present invention that it enables the supply of acid necessary to make up for losses to be effected without the use of acid as such, by providing the neutral alkyl compounds which set free the acid in the converter.

Also, while I have described the process more particularly in connection with the production of ethyl alcohol from ethylene, it will be understood that ethyl ether can be similarly produced, or other alcohols or ethers from other hydrocarbons, with due regard to the proper conditions of temperature, pressure, etc. maintained during the carrying out of the process, and preferably with the use of propyl sulfate, where propyl alcohol is being produced, etc.

I claim:

1. The improvement in the production of alcohols by the catalytic hydration of olefines with the use of an aqueous substantially non-volatile inorganic acid catalyst maintained at a high temperature and pressure and with continuous supply of the olefine hydrocarbon and steam thereto and continuous removal of alcohol vapors therefrom which comprises supplying an alkyl ester of the acid catalyst to the converter to make up for losses of acid during the process.

2. The improvement in the catalytic production of alcohols by the catalytic hydration of olefine hydrocarbons with the use of a dilute sulfuric acid catalyst maintained at a high temperature and pressure, and with continuous supply of admixed steam and ethylene to the acid catalyst and continuous withdrawal of alcohol vapors and admixed steam and ethylene therefrom which comprises supplying an alkyl sulfate to the body of sulfuric acid catalyst in proportion to make up for losses of acid in the prolonged carrying out of the process.

3. The improvement in the production of ethyl alcohol from ethylene with the use of a dilute sulfuric acid catalyst which comprises supplying admixed steam and ethylene continuously to a body of dilute sulfuric acid catalyst maintained at a high temperature and pressure and continuously withdrawing the resulting alcohol vapors admixed with steam and ethylene therefrom, and adding to the body of dilute acid catalyst, during the continuous carrying out of the process, ethyl sulfate to make up for losses of acid.

4. The improvement in the catalytic production of alcohols by the catalytic hydration of olefine hydrocarbons with the use of a dilute phosphoric acid catalyst maintained at a high temperature and pressure, and with continuous supply of admixed steam and ethylene to the acid catalyst and continuous withdrawal of alcohol vapors and admixed steam and ethylene therefrom which comprises supplying an alkyl phosphate to the body of phosphoric acid catalyst in proportion to make up for losses of acid in the prolonged carrying out of the process.

5. The improvement in the production of ethyl alcohol from ethylene with the use of a dilute phosphoric acid catalyst which comprises supplying admixed steam and ethylene continuously to a body of dilute phosphoric acid catalyst maintained at a high temperature and pressure and continuously withdrawing the resulting alcohol vapors admixed with steam and ethylene therefrom, and adding to the body of dilute acid catalyst, during the continuous carrying out of the process, ethyl phosphate to make up for losses of acid.

6. The improvement in the production of alcohols and ether by the catalytic hydration of olefines with the use of an aqueous substantially non-volatile inorganic acid catalyst maintained at a high temperature and pressure and with continuous supply of the olefine hydrocarbon and steam thereto and continuous removal of alcohol and ether vapors therefrom which comprises supplying an alkyl ester of the acid catalyst to the converter to make up for losses of acid during the process.

FREDERICK R. BALCAR.